United States Patent
Hasegawa et al.

[15] 3,684,785
[45] Aug. 15, 1972

[54] PROCESS FOR THE PRODUCTION OF CIS-1,4-POLYISOPRENE

[72] Inventors: Hiroaki Hasegawa, Tokuyama; Kouhei Kasai, Yokohama; Toshio Namizuka, Tokyo; Katsuo Moriguchi, Yokohama, all of Japan

[73] Assignee: The Japanese Geon Company Ltd., Tokyo, Japan

[22] Filed: Sept. 15, 1970

[21] Appl. No.: 72,367

[52] U.S. Cl..................................260/85.3, 260/94.3
[51] Int. Cl...........C08d 1/14, C08d 1/36, C08d 3/10
[58] Field of Search.....................260/94.3, 82.1, 85.3

[56] References Cited

UNITED STATES PATENTS 3,029,231    4/1962    Amerongen...............260/87.5
3,476,721    11/1969    Binder et al. .............260/82.1

Primary Examiner—Joseph L. Schofer
Assistant Examiner—Richard A. Gaither
Attorney—Sherman and Shalloway

[57] ABSTRACT

In the process for producing cis-1,4-polyisoprene by polymerizing isoprene using a catalyst consisting essentially of an organoaluminum compound and a titanium tetrahalide, the improved process which comprises effecting the polymerization reaction in the presence in the polymerization system of ethylene in an amount not exceeding 8 parts by weight per 100 parts by weight of the isoprene.

6 Claims, 1 Drawing Figure

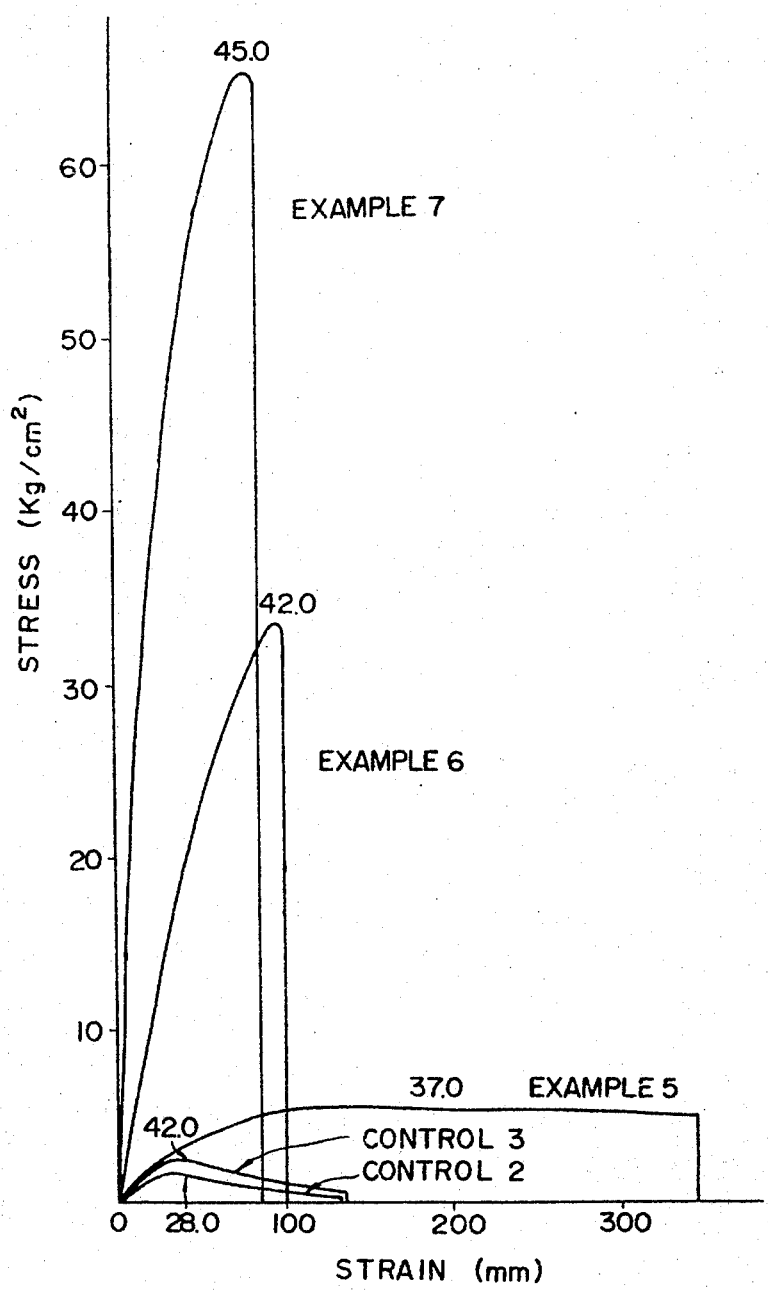

PROCESS FOR THE PRODUCTION OF CIS-1,4-POLYISOPRENE

This invention relates to a process for the production of cis-1,4-polyisoprene. More particularly, the invention relates to a process for producing cis-1,4-polyisoprene wherein in polymerizing isoprene using a catalyst consisting essentially of an organoaluminum compound and a titanium tetrahalide the polymerization reaction is conducted in the presence of a small amount of ethylene not exceeding 8 parts by weight per 100 parts by weight of isoprene.

Numerous reports regarding the method of producing polyisoprene containing the cis-1,4 configuration to a high degree have been made in the past. For example, it is well known that polyisoprene containing the cis-1,4 configuration to a high degree are formed by polymerizing isoprene using as the polymerization catalyst a suspension consisting of a trialkyl aluminum and titanium tetrachloride. The polyisoprene formed in this manner possesses properties which are such as to match natural rubber in many respects and thus is a very valuable elastomer for use as a general purpose rubber. On the other hand, there are such defects as that its unvulcanized rubber strength being low its processability is poor or that its modulus of elasticity is low. Various studies have been made for improving on these defects of cis-1,4-polyisoprene. One, for example, was that wherein it was conceived to increase the molecular weight. For obtaining a polymer of high molecular weight, this can be done by changing the polymerization conditions. For instance, the degree of polymerization usually can be raised by either lowering the polymerization temperature or reducing the amount of the catalyst. However, while a change of one of the factors of the polymerization conditions in this manner does bring about a desirable effect of increasing the molecular weight, on the other hand, undesirable results are concomitantly brought about. For example, when the polymerization temperature is lowered, the molecular weight rises but, on the other hand, since the polymerization speed is retarded, this becomes an exceeding disadvantage in the case where the operation is to be carried out commercially.

An object of the present invention is to provide a process for producing cis-1,4-polyisoprene wherein this elastomer is improved in its unvulcanized rubber strength and modulus of elasticity without changing the polymerization conditions, as noted hereinabove.

Other objects and advantages of the invention will become apparent from the following description.

I found that a polyisoprene of high Mooney viscosity could be produced without bringing about any changes in the polymerization speed and cis-1,4 content, if the polymerization of isoprene is carried out in the presence of a small amount of ethylene. I found, moreover, that the so produced polyisoprene had an unvulcanized rubber strength which was greatly superior to that of the conventional polyisoprene, being even superior to natural rubber.

According to the invention process, the Mooney viscosity of the polyisoprene formed varies in accordance with the changes in the amount of ethylene that is added to isoprene, the Mooney viscosity increasing as the amount added of ethylene is increased, provided the other conditions are constant. While it was known heretofore to use the alpha-olefins as a molecular weight modifier in polymerizing butadiene, it was rather unexpected that by the addition of a small amount of ethylene in the case of the polymerization of isoprene the Mooney viscosity would increase. And moreover, a surprising fact is that the addition of the alpha-olefins other than ethylene such, for example, as propylene, butene-1, isobutylene and styrene does not bring about an increase in the Mooney viscosity. Another interesting thing about the invention process is that the solution viscosity of the polymerization system demonstrates a pronounced drop as compared with the instance where the ethylene is absent. As a consequence, the heat removal from the polymerization system and its agitation is facilitated, thus making it easy to maintain the polymerization system in a uniform state.

Hence, cis-1,4-polyisoprene which has been improved in its unvulcanized rubber strength, a defect heretofore possessed by the polyisoprene rubber, as well as in its modulus of elasticity and tear strength is obtained when the invention process is followed. In addition, the drop in the solution viscosity of the polymerization system is surprising. For example, in the case of a pure rubber compound of polyisoprene formed by the presence of 2 parts by weight of ethylene per 100 parts by weight of isoprene, the unvulcanized rubber strength and modulus at 300 percent are both more than twice that of the usual polyisoprene. Again, the solution viscosity drops to below one-fourth. Usually, oil extending is economically important in the case where polyisoprene is to be used in a heavy duty tire using natural rubber, but in this case usually a high Mooney viscosity is required in order to qualify for use as a base polymer for oil extending use. The use for this purpose of the high Mooney viscosity polymer obtained by the invention process is an exceeding advantage.

The accompany drawing illustrates the increase in the unvulcanized rubber strength of the polyisoprene obtained by the invention process. The numerals indicated along the several curves are the compounded Mooney viscosity ($ML_{1+4}/100°$ C.) of the several samples.

The amount present of ethylene according to the invention process is an amount less than 8 parts by weight, and preferably 1-5 parts by weight, per 100 parts by weight of isoprene. When the amount of ethylene exceeds 8 parts by weight, the product obtained loses its properties as an elastomer and becomes unsuitable for use as a general purpose rubber. The ethylene may usually be added in advance to the mixture of the monomer and solvent but need not necessarily be limited to such a procedure.

The catalyst used is a Ziegler catalyst consisting essentially of two classes of components at least one being selected from each of the two groups of (A) an organoaluminum compound of the formula

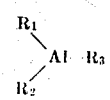

wherein $R_1$ is selected from the group consisting of hydrogen, halogen, alkyl, cycloalkyl, aryl and aralkyl, $R_2$ and $R_3$ are selected from the group consisting of alkyl, cycloalkyl, aryl and aralkyl; and (B) titanium tetrahalides. Also useable is one which has also been incorporated with a Lewis base, such as an amine, or an unpolymerizable ether, as a third component.

The organoaluminum compounds, which are useable in the invention, include such, for example, as trialkylaluminums as triethylaluminum, triisobutylaluminum and trihexylaluminum; tricycloalkylaluminums as tricyclopentylaluminum and tricyclohexylaluminum; triarylaluminums as triphenylaluminum and tri(o-, m- and p-tolyl) aluminum; triaralkylaluminums as tribenzylaluminum; and alkylaluminum halides as diethylaluminum chloride and other alkylaluminum compounds as diethylaluminum hydride.

The titanium tetrahalides, which are useable in the invention, include titanium tetrafluoride, titanium tetrachloride, titanium tetrabromide, titanium tetraiodide, and the mixtures thereof.

On the other hand, the ethers capable of being used include the aliphatic ethers, aromatic ethers, aliphatic-aromatic ether mixtures and the various types of cyclic ethers, examples being dimethyl ether, diethyl ether, di-n-butyl ether, diphenyl ether, anisole, styrene oxide, furan and tetrahydrofuran. Further, as the amines, useable optionally are the primary, secondary and tertiary amines of preferably not more than 18 carbon atoms such as methylamine, dimethylamine, trimethylamine, diethylamine, triethylamine and tripropylamine; the primary, secondary and tertiary allyl and aralkyl amines such as phenylamine, diphenylamine, triphenylamine and tribenzylamine; alicyclic amines such as cyclohexylamine; and heterocyclic amines such as pyridine, N-ethylpyridine and pyrrole.

The polymerization reaction is preferably carried out in the presence of a solvent. The solvents used are usually the inert organic hydrocarbons such, for example, as the aliphatic hydrocarbons as n-butane, n-pentane, n-hexane and n-heptane; the alicyclic hydrocarbons as cyclohexane; the aromatic hydrocarbons as benzene and toluene; the saturated halogenated hydrocarbons as ethylene dichloride; and mixtures of two or more of the foregoing hydrocarbons.

The catalyst used in practicing the present invention is highly sensitive to oxygen and water. Since these are harmful to the catalytic activity, it is necessary to ensure that oxygen and water are fully removed from the monomer, inert solvent and ethylene. The polymerization reaction is carried out by the addition to the polymerization system of a catalyst suspension obtained by mixing the tianium tetrahalide and the organoaluminum compound in the prescribed amounts (to which may also be added as a third component a Lewis base). In this case the proportion in which the titanium tetrahalide and organoaluminum compound are used is suitably a molar ratio of Al/Ti = 0.5 – 3.0, and preferably 0.7 – 1.5. On the other hand, the catalyst is conveniently used in such an amount as to amount to 0.1 – 20 millimols per each mol of the monomer. While the concentration of the monomer may be one within a relatively broad range, usually 10 – 40 percent by weight is used. The polymerization reaction can be carried out at a temperature ranging between $-5°$ and $70°C$.

For a more specific illustration of the invention the following non-limitative examples are given.

EXAMPLES I–IV

A 800-ml pressure bottle, after washing and drying, was thoroughly purged of its inside with nitrogen. This bottle was then charged with about 60 grams of isoprene, about 270 grams of n-hexane and ethylene in a varied quantity as indicated in Table 1. Separately, a 200-ml flask, after being washed, dried and thoroughly purged of its inside with nitrogen, was charged with 70 ml of a n-hexane solution of titanium tetrachloride (concentration 1.43 mols/liter), followed by the addition of 26.5 ml of a n-hexane solution of triisobutylaluminum (concentration 3.78 mols/liter) and 20 millimols of di-n-butyl ether, whereupon a brown precipitate solution (molar ratio of Al : Ti : ether = 1.0 : 1.0 : 0.2; titanium concentration 1.0 mol/liter) was obtained as the catalyst. This catalyst was added to the aforesaid pressure bottle with a syringe in amount corresponding to 7.5 millimols, calculated as titanium, per each mol of the monomer, after which the polymerization reaction was carried out for one hour at a polymerization temperature of $30°C$.

After completion of the polymerization reaction, the contents of the bottle was withdrawn and introduced into methanol containing 2 percent by weight of phenyl-beta-naphthylamine thereby solidifying the polymer, which was dried under vacuum for at least 12 hours at $70°$ C. The yield, gel content, Mooney viscosity, cement viscosity and content of cis-1,4 units were measured. The content of the cis-1,4 units was determined by means of infrared analysis. The gel content was measured in the following manner. 0.2 Gram of the polymer was placed in an 80-mesh wire gauze and dissolved for 24 hours with toluene. The portion remaining undissolved after this treatment was measured and this was designated the gel content. On the other hand, the cement viscosity was measured at the time of the completion of the polymerization reaction, using a Model B viscometer. The results obtained are shown in Table 1.

TABLE 1

| Experiment Number | Isoprene (g.) | n-Hexane (g.) | Ethylene (g.) | Ethylene to isoprene ratio* | Yield (percent) | Gel content (percent) | Cis-1,4 content (percent) | Mooney viscosity $ML_{1+4}$ $100°$ C. | Cement viscosity (CP) |
|---|---|---|---|---|---|---|---|---|---|
| Control 1 | 60 | 270 | | | 47.2 | 6.8 | 98.4 | 94.0 | 9,500 |
| Example I | 60 | 270 | 0.42 | 0.7 | 45.2 | 23.0 | 98.4 | 100.0 | 3,500 |
| Example II | 60 | 270 | 1.20 | 2.0 | 50.4 | 29.5 | 98.3 | 106.0 | 2,000 |
| Example III | 60 | 270 | 2.80 | 4.7 | 45.0 | 43.0 | 98.3 | 114.0 | 1,000 |
| Example IV | 60 | 270 | 4.80 | 8.0 | 46.0 | 65.4 | 98.4 | 120.0 | 500 |

*Parts by weight of ethylene per 100 parts by weight of isoprene.

EXAMPLES V–VIII

Ethylene in a varied quantity as indicated in Table 2 was added to 100 parts by weight of isoprene, the polymerization reaction being otherwise carried out as in Examples I–IV. The resulting polyisoprene, after being compounded in accordance with the following recipe, was tested for its properties.

| | Parts by Weight |
|---|---|
| Polyisoprene | 100 |
| Stearic acid | 1.0 |
| Zinc oxide | 5.0 |
| Sulfur | 2.5 |
| Calcium carbonate | 8.0 |
| Titanium dioxide | 5.0 |
| Benzthiazyldisulfide | 0.7 |
| Diphenyl guanidine | 0.3 |
| Hexamethylenetetramine | 0.1 |
| Styrenated phenol | 1.0 |

The polymer of Control II is the polymer obtained in Control I. On the other hand, the polymer of Control III was obtained by changing the amount of the catalyst to an amount corresponding to 4.0 millimols, calculated as titanium, per each mol of the monomer, and carrying out the polymerization reaction for 8 hours at a temperature of 0° C. The tensile strength, elongation, modulus at 300 percent, tear strength and unvulcanized rubber strength were measured in accordance with JIS K 6301–1962. In the tear strength test a JIS-A type piece was used as the specimen, while a dumbbell specimen No. 3 of a dimension 20 × 5 × 2 mm was used in measuring the unvulcanized rubber strength. The results obtained are shown in Table 2 and the accompanying drawing.

In the case of the Control IV polyisoprene in which the amount incorporated of the ethylene was 10 parts by weight, the compounded Mooney viscosity was excessive and no matter how the amounts of the compounding agents were changed, no great drop in this value could be achieved. Hence, it is clear that polyisoprene of this sort cannot be used as a general purpose rubber.

TABLE 3

| Control Experiment | alpha-olefin used | Alpha-Olefin to Isoprene Ratio* | Yield (%) | Gel content (%) | Cis-1,4 content (%) | Mooney viscosity $ML_{1+4}/100°C$ |
|---|---|---|---|---|---|---|
| V | — | — | 47.2 | 6.8 | 98.4 | 94.0 |
| VI | propylene | 5.0 | 40.3 | 5.5 | 98.2 | 92.0 |
| VII | butene-1 | 5.0 | 45.0 | 4.5 | 98.4 | 85.0 |
| VIII | isobutylene | 5.0 | 45.8 | 4.0 | 98.3 | 86.0 |
| IX | styrene | 5.0 | 42.0 | 4.9 | 98.9 | 90.0 |

*Parts by weight of alpha-olefin per 100 parts by weight of isoprene.

We claim:

1. In the process for producing cis-1,4-polyisoprene by polymerizing isoprene using a catalyst consisting essentially of an organoaluminum compound of the formula

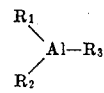

wherein $R_1$ is selected from the group consisting of hydrogen, halogen, alkyl, cycloalkyl, aryl and aralkyl, and $R_2$ and $R_3$ are selected from the group consisting of alkyl, cycloalkyl, aryl and aralkyl, and a titanium tetrahalide, the improvement which comprises effecting the polymerization reaction in the presence in the polymerization system of ethylene in an amount not exceeding 8 parts by weight per 100 parts by weight of the isoprene.

2. The process of claim 1 wherein the molar ratio of titanium to aluminum in said catalyst is 1:0.5–1:3.0.

TABLE 2

| Experiment number | Amount added of ethylene (wt. part) | Polymer Mooney viscosity $ML_{1+4}/100°C$ | Compounded Mooney viscosity, $ML_{1+4}/100°C$ | Tensile strength (kg./cm.²) 30 min.[1] | 40 min.[1] | Elongation (percent) 30 min.[1] | 40 min.[1] | Modulus at 300% (kg./cm.²) 30 min.[1] | 40 min.[1] | Tear strength (kg./cm.²) 30 min.[1] | 40 min.[1] | Unvulcanized rubber strength, (kg./cm.²) (maximum stress) |
|---|---|---|---|---|---|---|---|---|---|---|---|---|
| Control II | 0 | 94.0 | 28.0 | 188 | 174 | 730 | 730 | 22 | 23 | 29 | 30 | 1.5 |
| Control III | 0 | 110.0 | 42.0 | 195 | 184 | 720 | 720 | 27 | 28 | 30 | 32 | 2.5 |
| Example V | 1.5 | 104.0 | 37.0 | 195 | 193 | 690 | 690 | 30 | 30 | 32 | 33 | 5.3 |
| Example VI | 2.6 | 109.5 | 42.0 | 187 | 174 | 560 | 560 | 81 | 76 | 47 | 52 | 33.0 |
| Example VII | 5.0 | 115.0 | 45.0 | 175 | 150 | 500 | 510 | 120 | 118 | 55 | 57 | 65.0 |
| Control IV | 10.0 | 125.0 | 80.0 | 110 | 95 | 70 | 65 | | | 64 | 70 | |

[1] Vulcanization time.

CONTROLS V – IX

The polymerization reaction was carried out as in Examples I – IV, using as the alpha-olefin either propylene, butene-1, isobutylene or styrene instead of ethylene. The results obtained are shown in Table 3.

It can be seen from these control experiments that the Mooney viscosity of polyisoprene does not increase by the addition of the alpha-olefins other than ethylene. It is also noted that no increase takes place in the unvulcanized rubber strength of these polyisoprenes.

3. The process of claim 1 wherein said catalyst is used in an amount that the titanium tetrahalide is present in an amount of 0.1–20 millimols per mol of isoprene.

4. The process of claim 1 wherein the polymerization reaction is carried out at a temperature ranging between -5° and 70° C.

5. The process of claim 1 wherein the polymerization reaction is carried out in an inert hydrocarbon solvent.

6. The process of claim 5 wherein the isoprene concentration in the solvent is 10 – 40 percent by weight.

* * * * *